US012576790B1

US 12,576,790 B1

(12) United States Patent
Dai

(10) Patent No.: US 12,576,790 B1
(45) Date of Patent: Mar. 17, 2026

(54) ELECTRIC CART AND FOLDABLE STORAGE BASKET THEREOF

(71) Applicant: Xiamen Dalle New Energy Automobile Co., Ltd, Xiamen (CN)

(72) Inventor: Side Dai, Xiamen (CN)

(73) Assignee: Xiamen Dalle New Energy Automobile Co., Ltd, Xiamen (CN)

( * ) Notice: Subject to any disclaimer, the term of this patent is extended or adjusted under 35 U.S.C. 154(b) by 0 days.

(21) Appl. No.: 19/317,434

(22) Filed: Sep. 3, 2025

(30) Foreign Application Priority Data

Dec. 25, 2024 (CN) .......................... 202423217474.X

(51) Int. Cl.
| | |
|---|---|
| *B60R 9/06* | (2006.01) |
| *A63B 55/60* | (2015.01) |
| *B60R 5/04* | (2006.01) |
| *B60R 11/00* | (2006.01) |

(52) U.S. Cl.
CPC ..................................... *B60R 9/06* (2013.01)

(58) Field of Classification Search
CPC ..... B60R 9/06; B60R 2011/0082; B60R 5/04; B60R 5/041; B60R 5/045; B60R 5/042; A63B 55/61
USPC ........................................ 224/488, 497, 549
See application file for complete search history.

(56) References Cited

U.S. PATENT DOCUMENTS

| | | | | | |
|---|---|---|---|---|---|
| 1,179,445 | A | * | 4/1916 | Manning | B60R 7/043 224/275 |
| 1,606,954 | A | * | 11/1926 | Moen | B62D 43/02 224/489 |
| 1,686,450 | A | * | 10/1928 | Henry | B60R 5/041 224/510 |
| 1,941,860 | A | * | 1/1934 | Hanson | B60R 5/041 224/500 |
| 6,382,486 | B1 | * | 5/2002 | Kretchman | B60R 9/06 224/498 |
| 6,712,248 | B2 | * | 3/2004 | Mitchell | B60R 9/06 224/498 |
| 6,848,732 | B2 | * | 2/2005 | Green | B60P 3/03 296/24.33 |
| 7,246,733 | B2 | * | 7/2007 | Threet | B60R 9/06 224/498 |
| 7,316,339 | B2 | * | 1/2008 | Zhang | B60R 9/06 224/524 |

(Continued)

*Primary Examiner* — Nathan J Newhouse
*Assistant Examiner* — Lester L Vanterpool
(74) *Attorney, Agent, or Firm* — Cooper Legal Group, LLC

(57) ABSTRACT

An electric cart includes two upright posts, and a mounting frame is fixedly mounted between the two upright posts. A foldable storage basket is mounted on the mounting frame and includes a folding assembly, one or more supporting pulling ropes, and one or more slow-descent devices. The folding assembly is configured to be unfolded to form a storage space. The mounting frame includes two side mounting plates and a transverse beam. The folding assembly includes a first foldable bottom plate rotatably connected to the two side mounting plates, and at least one side of the first foldable bottom plate is disposed with the one or more supporting pulling ropes and the one or more slow-descent devices. When the folding assembly is released, the first foldable bottom plate is rotated downward, and the one or more slow-descent devices reduces a speed of a downward rotation of the first foldable bottom plate.

18 Claims, 7 Drawing Sheets

(56)  References Cited

U.S. PATENT DOCUMENTS

| | | | | |
|---|---|---|---|---|
| 7,350,681 B2* | 4/2008 | Polburn | | B60R 7/005 |
| | | | | 296/37.16 |
| 8,061,571 B2* | 11/2011 | Aghajanian | | B60R 9/06 |
| | | | | 224/527 |
| 8,348,322 B2* | 1/2013 | King | | B62D 47/003 |
| | | | | 296/65.09 |
| 8,474,561 B2* | 7/2013 | Allingham | | B62K 5/01 |
| | | | | 280/727 |
| 9,155,948 B2* | 10/2015 | Tian | | B62B 3/04 |
| 10,384,617 B1* | 8/2019 | Keyser | | B60R 9/06 |
| 10,899,284 B2* | 1/2021 | Descoteaux | | B60R 11/06 |
| 10,953,808 B2* | 3/2021 | Hyatt | | B60R 9/06 |
| 11,407,340 B2* | 8/2022 | Moore | | B60N 2/36 |
| 11,560,099 B2* | 1/2023 | Pinkston | | B60R 9/06 |
| 11,858,466 B2* | 1/2024 | Gandolfo | | B60R 7/043 |
| 2003/0173387 A1* | 9/2003 | Mitchell | | B60R 9/06 |
| | | | | 224/499 |
| 2005/0224544 A1* | 10/2005 | Myers | | B60R 7/02 |
| | | | | 224/498 |
| 2005/0242141 A1* | 11/2005 | Zhang | | B60R 9/06 |
| | | | | 224/499 |
| 2009/0020576 A1* | 1/2009 | Gale | | B60R 9/06 |
| | | | | 224/498 |
| 2010/0001029 A1* | 1/2010 | Tai | | B60R 9/06 |
| | | | | 224/510 |
| 2015/0021371 A1* | 1/2015 | Ward | | B60R 9/06 |
| | | | | 224/499 |
| 2016/0368427 A1* | 12/2016 | Field, Jr. | | B60R 9/065 |
| 2019/0135189 A1* | 5/2019 | Clark | | B60R 9/06 |
| 2019/0322220 A1* | 10/2019 | Linn | | B60R 5/041 |
| 2021/0316667 A1* | 10/2021 | Pinkston | | B60R 9/06 |
| 2021/0331538 A1* | 10/2021 | Kato | | B60D 1/54 |
| 2022/0041419 A1* | 2/2022 | Ballard | | B60R 11/06 |
| 2023/0051119 A1* | 2/2023 | Broadwell | | A63B 55/60 |
| 2024/0109463 A1* | 4/2024 | Wilckens | | B60N 2/3097 |
| 2024/0399967 A1* | 12/2024 | Deshpande | | B60R 9/02 |
| 2025/0162506 A1* | 5/2025 | Schaenzer | | B60R 5/041 |
| 2025/0249324 A1* | 8/2025 | Dai | | A63B 55/61 |
| 2025/0249325 A1* | 8/2025 | Dai | | B60N 3/103 |
| 2025/0303975 A1* | 10/2025 | Dai | | B60R 9/06 |

* cited by examiner

ELECTRIC CART AND FOLDABLE STORAGE BASKET THEREOF

RELATED APPLICATIONS

This application claims priority to Chinese patent application number 202423217474.X, filed on Dec. 25, 2024. Chinese patent application number 202423217474.X is incorporated herein by reference.

FIELD OF THE DISCLOSURE

The present disclosure relates to a foldable storage basket and in particular to an electric cart and a foldable storage basket thereof.

BACKGROUND OF THE DISCLOSURE

Electric carts are mainly used to transport people and backpacks and other items. Common electric carts include golf carts, sightseeing tour buses, shared battery carts, passenger battery carts, etc. In order to facilitate storage, a storage basket and a backpack rack are set on a back seat of the electric cart.

Currently, most storage baskets on the market feature a foldable design, including a base basket that expands and contracts through a hinged connection. This allows the storage basket to be folded up when not in use, reducing an occupied space, while unfolding when needed to increase storage capacity. However, this structure relies on steel wires on the sides of the base basket to secure the base basket when the base basket is unfolded. If the base basket suddenly falls downward, this can easily cause damage to the steel wires and the hinged connection.

BRIEF SUMMARY OF THE DISCLOSURE

The present disclosure aims to solve a problem that there is no buffer when a foldable storage basket is unfolded, which easily causes a steel wire to be damaged by instantaneous tightening, and thus provides a foldable storage basket for an electric vehicle.

In order to solve the above technical problems, the present disclosure provides a foldable storage basket of an electric cart. The electric cart comprises two upright posts disposed on two sides of a rear of the electric cart, and a mounting frame is fixedly mounted between the two upright posts. The foldable storage basket is mounted on the mounting frame, and the foldable storage basket comprises a folding assembly, one or more supporting pulling ropes, and one or more slow-descent devices. The folding assembly is configured to be unfolded to form a storage space, and the mounting frame comprises two side mounting plates and a transverse beam connected to the two side mounting plates. The folding assembly comprises a first foldable bottom plate rotatably connected to the two side mounting plates, and at least one side of the first foldable bottom plate is disposed with the one or more supporting pulling ropes. The at least one side of the first foldable bottom plate is disposed with the one or more slow-descent devices. When the folding assembly is released to be unfolded, the first foldable bottom plate is rotated downward, and the one or more slow-descent devices are configured to reduce a speed of a downward rotation of the first foldable bottom plate.

In a preferred embodiment, the folding assembly comprises a second foldable bottom plate, a foldable upright plate, and two side rails. An inner side of the first foldable bottom plate is rotatably connected to the two side mounting plates, and an inner side of the second foldable bottom plate is rotatably connected to an outer side of the first foldable bottom plate. A bottom edge of the foldable upright plate is rotatably connected to an outer side of the second foldable bottom plate, and the two side rails are respectively mounted on two sides of the foldable upright plate. Ends of the two side rails away from the foldable upright plate are detachably connected to the two upright posts by insertion.

In a preferred embodiment, each of the two side rails comprises a first connecting rod and a second connecting rod, and the second connecting rod is located below the first connecting rod. The first connecting rod and the second connecting rod are connected by a connecting plate, and the first connecting rods of the two side rails are misaligned with each other in an up-and-down direction along the two sides of the foldable upright plate, so that the first connecting rods of the two side rails are misaligned with each other after being folded. A sum of lengths of the second connecting rods of the two side rails is less than or equal to a length of the bottom edge of the foldable upright plate.

In a preferred embodiment, an end of the first connecting rod of each of the two side rails away from the foldable upright plate is disposed with an insertion member, and a position of the transverse beam of the mounting frame corresponding to the insertion member is disposed with an insertion plate. The insertion member comprises a housing and a first insertion pin movably disposed in the housing, and the insertion plate comprises a first insertion hole. The housing comprises a sliding groove, and the first insertion pin is configured to slide in the sliding groove so as to alternatively slide to a first position or a second position. When the first insertion pin is in the first position, the first insertion pin is disposed in the first insertion hole, and the first connecting rod is connected to the mounting frame. When the first insertion pin is in the second position, the first insertion pin is separated from the first insertion hole, and the first connecting rod is separated from the mounting frame.

In a preferred embodiment, the first insertion pin is disposed with a protrusion, and the protrusion extends out of the sliding groove. A rear end of the first insertion pin is fixedly connected to an elastic member, and the elastic member is confined in the housing. The first insertion pin is configured to be driven by the elastic member to extend out to be disposed in the first insertion hole.

In a preferred embodiment, each of the two side mounting plates is disposed with a second insertion pin corresponding to the first position of the insertion member, and the insertion member comprises a second insertion hole. When the first insertion pin is in the first position, the second insertion pin is disposed in the second insertion hole. The second insertion pin is configured to be separated from the second insertion hole to allow the first insertion pin to be separated from the first insertion hole.

In a preferred embodiment, the one or more slow-descent devices are pneumatic rods or hydraulic rods.

In a preferred embodiment, the first foldable bottom plate comprises a first locking buckle, and the transverse beam is disposed with a supporting frame. The supporting frame comprises a second locking buckle corresponding to the first locking buckle. When the folding assembly is folded, the first locking buckle is buckled to the second locking buckle. The second locking buckle is disposed with an unlocking member configure to release the first locking buckle.

In a preferred embodiment, the first locking buckle has a U-shaped buckle, and the second locking buckle comprises a fixed plate and a hook plate rotatably connected to the fixed plate via a torsion spring. An outward side of the fixed plate comprises a buckling groove, and the hook plate comprises a hook portion disposed in the buckling groove. The U-shaped buckle is configured to be disposed in the buckling groove, so that an outer side of the U-shaped buckle is hooked by the hook portion to form a locking connection. The unlocking member is connected to the hook plate via a connecting rod, and the unlocking member is configured to be moved upward to drive the hook plate to move upward through the connecting rod, causing the hook portion to be separated from the U-shaped buckle.

The present disclosure provides the electric cart comprising the foldable storage basket of the electric cart.

Compared with the existing techniques, the technical solution has the following advantages.

By arranging the one or more slow-descent devices on the at least one side of the first foldable bottom plate, when the folding assembly is released and the first foldable bottom plate flips over relative to the two upright posts, the speed of the downward rotation of the first foldable bottom plate can be slowed down, thereby preventing the first foldable bottom plate from flipping down instantly, resulting in damage to the one or more supporting pulling ropes caused by instantaneous tightening and damage to a pivotal connection of the foldable bottom plate.

Figure 1:
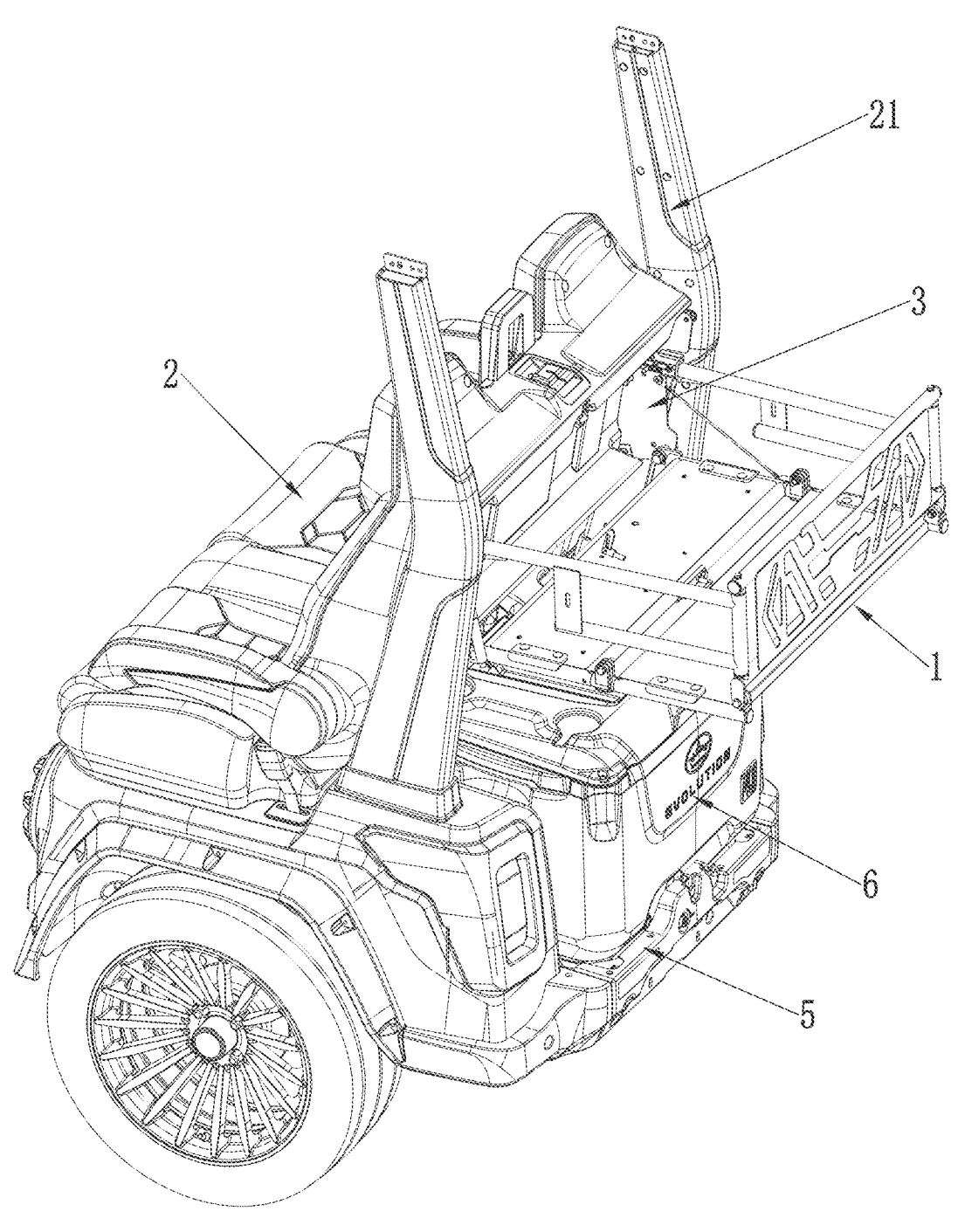
FIG. 1 is a perspective view of a foldable storage basket at a rear of an electric cart according to a preferred embodiment of the present disclosure.

Explanation of Reference Numerals: 1. foldable storage basket; 11. first foldable bottom plate; 111. connecting shaft; 112. pulling rope connecting head; 113. first locking buckle; 114. u-shaped buckle; 12. second foldable bottom plate; 121. pivotal structure; 13. foldable upright plate; 14. side rail; 141. rotating shaft; 142. first connecting rod; 143. second connecting rod; 144. connecting plate; 15. supporting pulling rope; 16. insertion member; 161. housing; 162. first insertion pin; 163. sliding groove; 164. protrusion; 165. elastic member; 166. second insertion hole; 17. slow-descent device; 2. rear seat; 21. upright post; 3. mounting frame; 31. side mounting plate; 32. transverse beam; 33. insertion plate;

34. first insertion hole; 35. second insertion hole; 4. supporting frame; 41. second locking buckle; 42. unlocking member; 43. fixed plate; 44. torsion spring; 45. hook plate; 46. buckling groove; 47. hook portion; 48. connecting rod; 5. tray; 6. ice bucket.

DETAILED DESCRIPTION OF THE EMBODIMENTS

The technical solutions in the embodiments of the present disclosure will be clearly and completely described below in conjunction with the drawings in the embodiments of the present disclosure. It is obvious that the described embodiments are only part of the embodiments of the present disclosure, rather than all the embodiments. Based on the embodiments of the present disclosure, all other embodiments obtained by ordinary technicians in this field without making creative work are within the scope of protection of the present disclosure.

In the description of the present disclosure, it should be noted that the terms "upper," "lower," "inner," "outer," "top," "bottom," and the like, indicating orientations or positional relationships, are based on the orientations or positional relationships shown in the accompanying drawings and are intended solely to facilitate the description of the present disclosure and simplify the description. They are not intended to indicate or imply that the devices or components referred to must have a specific orientation, be constructed, or operate in a specific orientation. Therefore, they should not be construed as limitations on the present disclosure. Furthermore, the terms "first" and "second" are used for descriptive purposes only and should not be construed as indicating or implying relative importance.

In the description of the present disclosure, it should be noted that, unless otherwise clearly specified and limited, the terms "installed", "provided with", "sleeved on", "connected", etc. should be understood in a broad sense. For example, "connection" can be a wall-mounted connection, a detachable connection, or an integral connection. It can be a mechanical connection or an electrical connection. It can be a direct connection or an indirect connection through an intermediate medium. It can be the internal connection of two components. For ordinary technicians in this field, the specific meanings of the above terms in the present disclosure can be understood according to specific circumstances.

Referring to FIGS. 1-8, this embodiment provides a foldable storage basket 1, and the foldable storage basket 1 is disposed on a rear of an electric cart. The electric cart comprises two upright posts 21 disposed behind a rear seat 2 of the electric cart. The two upright posts 21 are disposed on two opposite sides of the electric cart, and a mounting frame 3 is fixedly mounted between the two upright posts 21. The foldable storage basket 1 is mounted on the mounting frame 3 (as shown in FIG. 1). The foldable storage basket 1 can be unfolded relative to the two upright posts 21 to form a basket structure for storage. The foldable storage basket 1 can be folded and buckled to the mounting frame 3, allowing for easy use of a tray 5 located below the rear of the electric cart. The tray 5 below the foldable storage basket 1 can be used to place an ice bucket 6. The electric cart mentioned in this embodiment can be used as a golf cart, a sightseeing tour vehicle, a shared battery vehicle, a passenger battery vehicle, etc.

Figure 2:
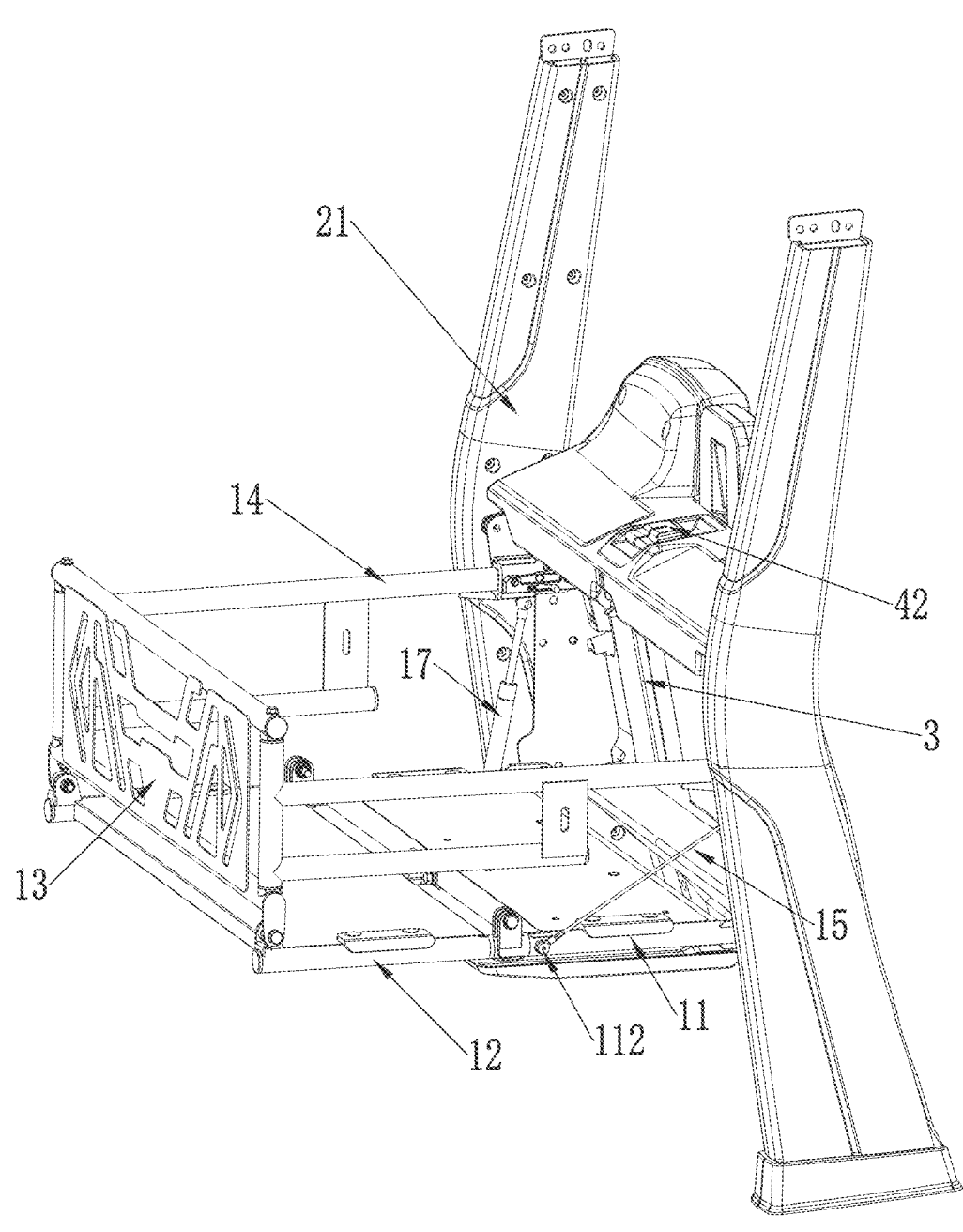
FIG. 2 is a perspective view of the foldable storage basket in an unfolded state according to the preferred embodiment of the present disclosure.
Figure 3:
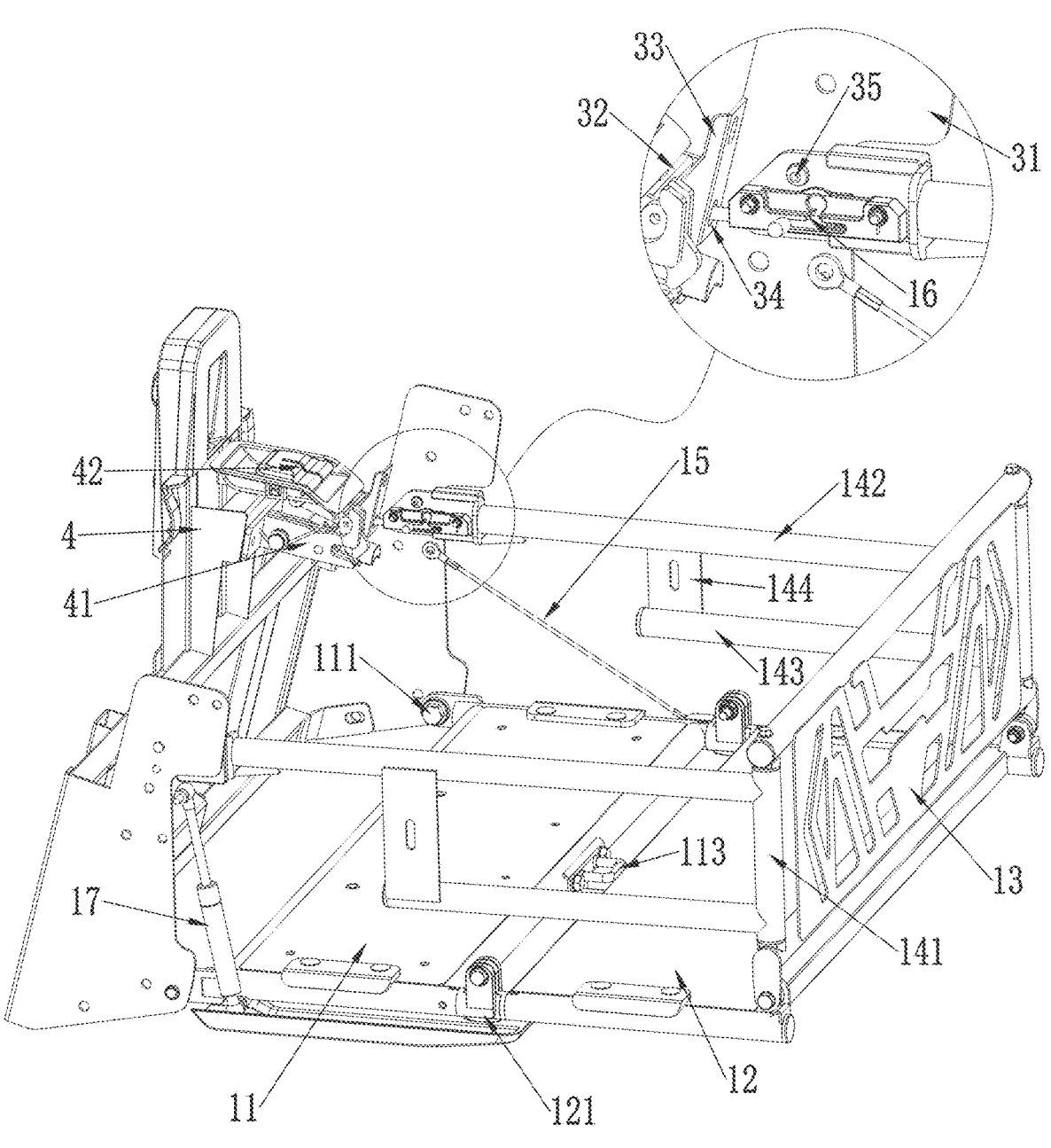
FIG. 3 is a perspective view of an overall structure of the foldable storage basket according to the preferred embodiment of the present disclosure.

As shown in FIGS. 2-3, the foldable storage basket 1 comprises a folding assembly, one or more supporting pulling ropes 15, and one or more slow-descent devices 17. The folding assembly comprises a first foldable bottom plate 11, a second foldable bottom plate 12, a foldable upright plate 13, and two side rails 14. The mounting frame 3 comprises two side mounting plates 31 and a transverse beam 32 connected to the two side mounting plates 31. An inner side of the first foldable bottom plate 11 is rotatably connected to the two side mounting plates 31 through a connecting shaft 111. An inner side of the second foldable bottom plate 12 is rotatably connected to an outer side of the first foldable bottom plate 11 through a pivotal structure 121. A bottom edge of the foldable upright plate 13 is rotatably connected to an outer side of the second foldable bottom plate 12. The two side rails 14 are respectively mounted on two sides of the foldable upright plate 13 and are rotatably connected to the two sides of the foldable upright plate 13.

Figure 7:
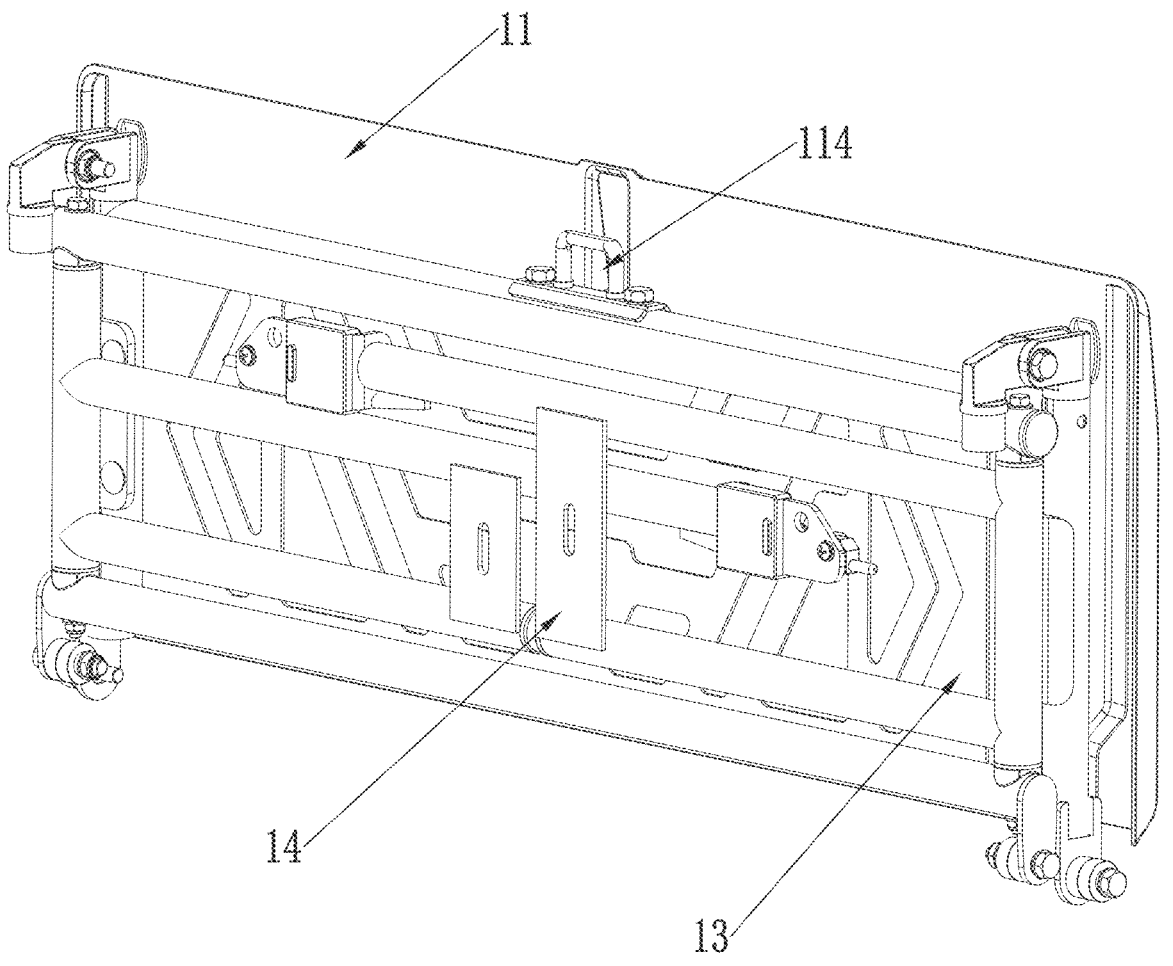
FIG. 7 is a perspective view of the foldable storage basket according to the preferred embodiment of the present disclosure, when the foldable storage basket is fully folded.
Figure 8:
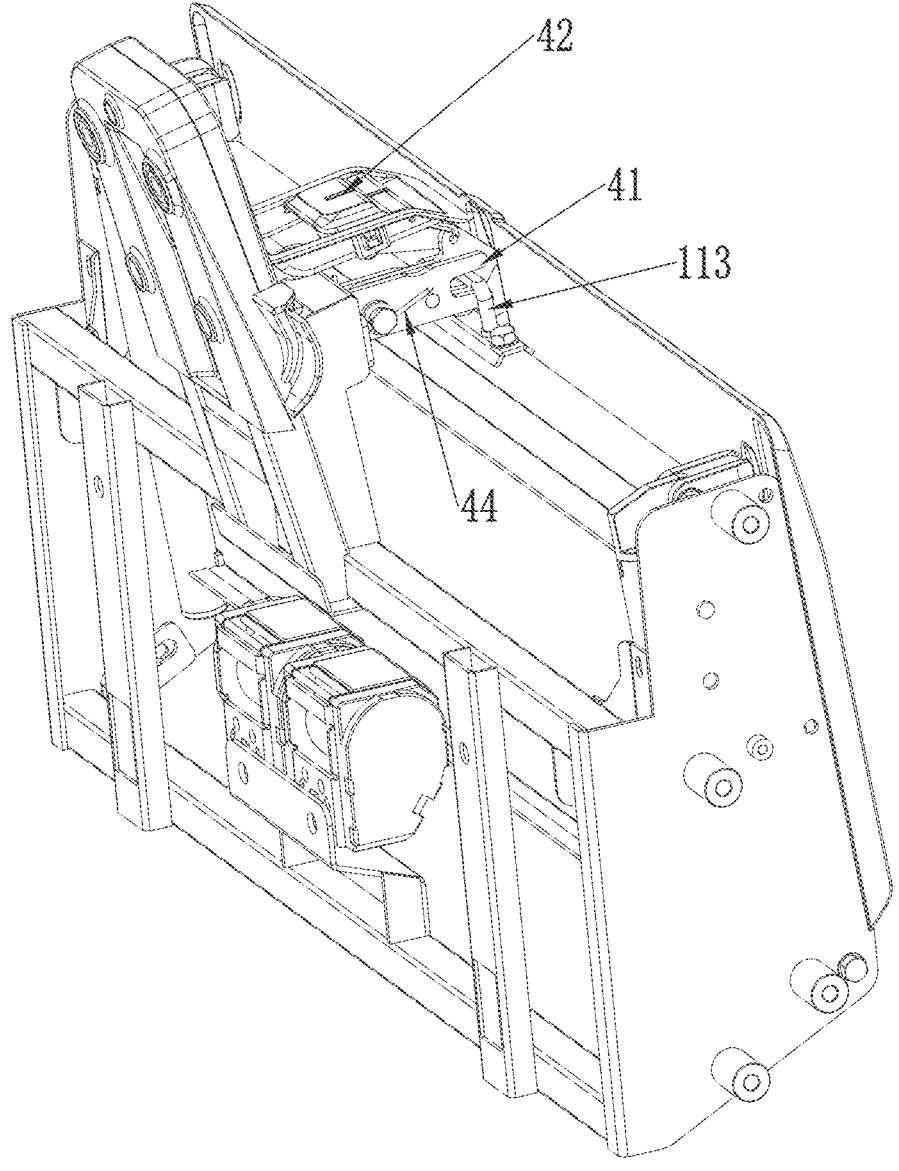
FIG. 8 is a perspective view of the foldable storage basket according to the preferred embodiment of the present disclosure after being folded and locked at the rear of the electric cart.

When the foldable storage basket 1 is unfolded for use, the first foldable bottom plate 11 is first rotated downward from the two side mounting plates 31 so as to be unfolded horizontally. Then, the second foldable bottom plate 12 is rotated outward around the first foldable bottom plate 11 so as to be unfolded horizontally. Then, the foldable upright plate 13 is rotated upward so as to be unfolded vertically around the second foldable bottom plate 12. Finally, the two side rails 14 are rotated and unfolded outward. The two side rails 14 are connected to the mounting frame 3 by insertion to form a fixed connection. As a result, an unfolded state of the foldable storage basket 1 is shown in FIG. 2. When the foldable storage basket 1 is folded, a folding operation is performed in a reverse order of the installation and unfolding steps. After folding, the first foldable bottom plate 11 is locked to the mounting frame 3. A folded state of the foldable storage basket 1 is shown in FIG. 7, and a locking state of the first foldable bottom plate 11 to the mounting frame 3 is shown in FIG. 8.

A specific structural design of the foldable storage basket 1 is described as follows.

The first foldable bottom plate 11 is pivotally connected to the two side mounting plates 31 through the connecting shaft 111 on the inner side of the first foldable bottom plate 11. The one or more supporting pulling ropes 15 are connected to one of the two side mounting plates 31. A design of the one or more supporting pulling ropes 15 is shown in FIG. 3. An end of the one or more supporting pulling ropes 15 away from the one of the two side mounting plates 31 is fixedly connected to a pulling rope connecting head 112 on the first foldable bottom plate 11 (see FIG. 2). The pulling rope connecting head 112 is located on the outer side of the first foldable bottom plate 11. The one or more supporting pulling ropes 15 are used to support the first foldable bottom plate 11 in a horizontal position after the first foldable bottom plate 11 is unfolded, facilitating unfolding or folding of the other folding structures.

In order to avoid the problem that the first foldable bottom plate 11 instantly flips down after a locking connection between the first foldable bottom plate 11 and the mounting frame 3 is released, causing the one or more supporting pulling ropes 15 to be instantly tightened and damaged, the one or more slow-descent devices 17 are provided between the connection between one of the two side mounting plates 31 and the first foldable bottom plate 11. The one or more slow-descent devices 17 can be a pneumatic rod or a hydraulic rod. When the first foldable bottom plate 11 is lowered, the one or more slow-descent devices 17 can slowly lower the first foldable bottom plate 11. When the first foldable bottom plate 11 needs to be folded, an external force is applied to press the one or more slow-descent devices 17 to lock the first foldable bottom plate 11 on the mounting frame 3. In this embodiment, the one or more supporting pulling ropes 15 are disposed on one side of the first foldable bottom plate 11, and the one or more slow-descent devices 17 are disposed on the other side of the first foldable bottom plate 11.

The two side rails 14 are rotatably connected to the two sides of the foldable upright plate 13. Each of the two side rails 14 comprises a first connecting rod 142 and a second connecting rod 143, and the second connecting rod 143 is located below the first connecting rod 142. The first connecting rod 142 and the second connecting rod 143 are connected by a connecting plate 144. Each of the two side rails 14 comprises a rotating shaft 141 mounted on a corresponding one of the two sides of the foldable upright plate 13, and the first connecting rod 142 and the second connecting rod 143 are connected to the rotating shaft 141. The first connecting rod 142 and the second connecting rod 143 are rotated relative to the foldable upright plate 13 through the rotating shaft 141. When folding, the first connecting rod 142 and the second connecting rod 143 are driven by the rotating shaft 141 to rotate inward so as to be folded and placed on an inner side of the foldable upright plate 13. In order to save storage space and reasonably arrange a folding placement orientation, the first connecting rods 142 of the two side rails 14 are misaligned with each other in an up-and-down direction along the two sides of the foldable upright plate 13. The first connecting rods 142 of the two side rails 14 can be rotated inward to form a misaligned folding storage. A sum of lengths of the second connecting rods 143 of the two side rails 14 is less than or equal to a length of the bottom edge of the foldable upright plate 13. When folded, the second connecting rods 143 of the two side rails 14 can be placed flush on the foldable upright plate 13, so that the second connecting rods 143 of the two side rails 14 will not overlap and interfere with each other after folding. For the specific structure, please refer to FIG. 7.

A fixed insertion connection between each of the two side rails 14 and the mounting frame 3 is configured as a detachable insertion structure. An end of the first connecting rod 142 of each of the two side rails 14 away from the foldable upright plate 13 is disposed with an insertion member 16, and each of two ends of the transverse beam 32 of the mounting frame 3 is disposed with an insertion plate 33. The insertion member 16 and the insertion plate 33 form a detachable insertion connection, as shown in FIG. 4.

Figure 4:
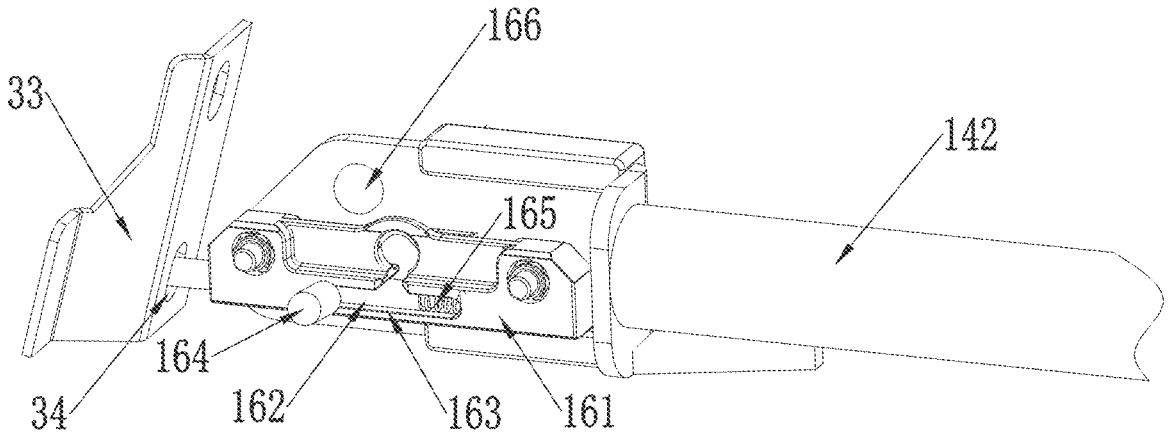
FIG. 4 is a perspective view of an insertion connection between a side rail of the foldable storage basket and an upright post according to the preferred embodiment of the present disclosure.

As shown in FIG. 4, the insertion member 16 comprises a housing 161 and a first insertion pin 162 movably disposed in the housing 161. The insertion plate 33 comprises a first insertion hole 34, and the first insertion pin 162 is configured to be inserted into the first insertion hole 34 to form an insertion connection. A side of the housing 161 comprises a sliding groove 163, and the first insertion pin 162 is disposed with a protrusion 164. An elastic member 165 is disposed in the housing 161. A rear end of the first insertion pin 162 is fixedly connected to one end of the elastic member 165. The elastic member 165 is confined in the housing 161 and can be compressed or rebounded along a length direction of the first insertion pin 162. The other end of the first insertion pin 162, driven by the elastic member 165, extends out of the housing 161 and can be inserted into the first insertion hole 34.

Due to the protrusion 164, the first insertion pin 162 slides in the groove 163 to a first position and a second position. When in the first position or the second position, the protrusion 164 respectively abuts two extreme ends of the sliding groove 163. In the first position, the first insertion pin 162 is inserted into the first insertion hole 34, and the first connecting rod 142 is connected to the transverse beam 32. In the second position, the first insertion pin 162 is separated from the first insertion hole 34, and the first connecting rod 142 is separated from the transverse beam 32. When the foldable storage basket 1 is unfolded, the two side rails 14 on two sides of the foldable storage basket 1 are unfolded and connected to the insertion plates 33 using the insertion members 16. When the foldable storage basket 1 is folded, the protrusion 164 is simply pressed outward, causing the first insertion pin 162 to compress the elastic member 165 to retract, and the first insertion pin 162 is separated from the first insertion hole 34, allowing the two side rails 14 to be folded freely. By fixing the two side rails 14 to the mounting frame 3 on the rear of the electric cart, stability of the foldable storage basket is enhanced, preventing items from sliding or falling during travel.

To ensure the foldable storage basket 1 can better support weight when unfolded, the detachable insertion structure between each of the two side rails 14 and the mounting frame 3 comprises a load-bearing structure. The load-bearing structure supports the weight and stabilizes the fixed insertion connection of the two side rails 14. Specifically, each of the two side mounting plates 31 at the two ends of the transverse beam 32 is disposed with a second insertion pin 35 corresponding to the first position of the insertion member 16. The insertion member 16 comprises a second insertion hole 166 (see FIG. 4) corresponding to the second insertion pin 35. When the foldable storage basket 1 is unfolded, the two side rails 14 are unfolded, and the second insertion pin 35 is inserted into the second insertion hole 166 (see FIG. 3) to initially support the weight. After the second insertion pin 35 is connected to the second insertion hole 166, the first insertion pin 162 is inserted into the first insertion hole 34 to prevent the two side rails 14 from falling off. When the foldable storage basket 1 is folded, the first insertion pin 162 is first separated from the first insertion hole 34, and then the second insertion pin 35 is separated from the second insertion hole 166, allowing the two side rails 14 to be folded.

After the foldable storage basket 1 is folded, the first foldable bottom plate 11 is buckled to the transverse beam 32 to achieve a fixed connection. The transverse beam 32 is disposed with a supporting frame 4, and the supporting frame 4 comprises a second locking buckle 41. A first locking buckle 113 is located on a middle of the outer side of the first foldable bottom plate 11. The first locking buckle 113 is buckled to the second locking buckle 41, maintaining the foldable storage basket 1 in a folded state. For a detailed structure, see FIG. 8. The second locking buckle 41 is disposed with an unlocking member 42 to release a buckling connection of the second locking buckle 41 to allow the foldable storage basket 1 to be unfolded.

Figure 5:
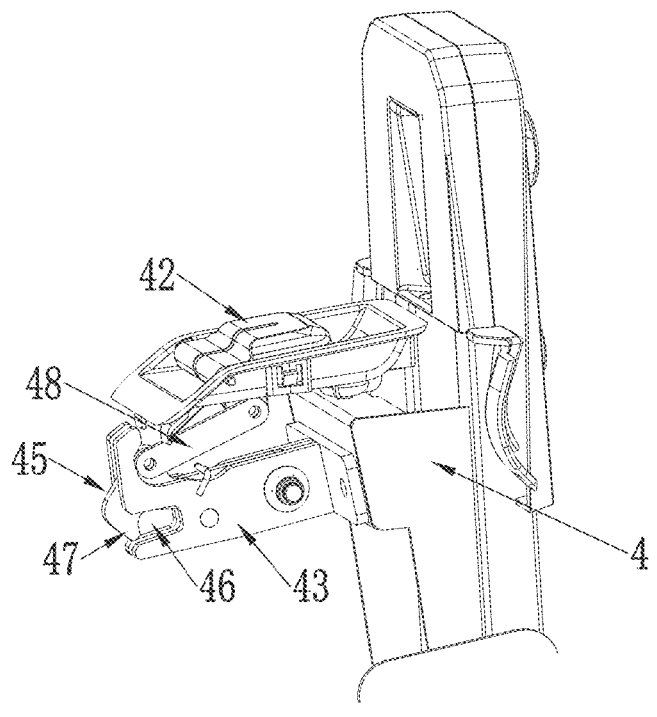
FIG. 5 is a perspective view of a second locking buckle in the preferred embodiment of the present disclosure.
Figure 6:
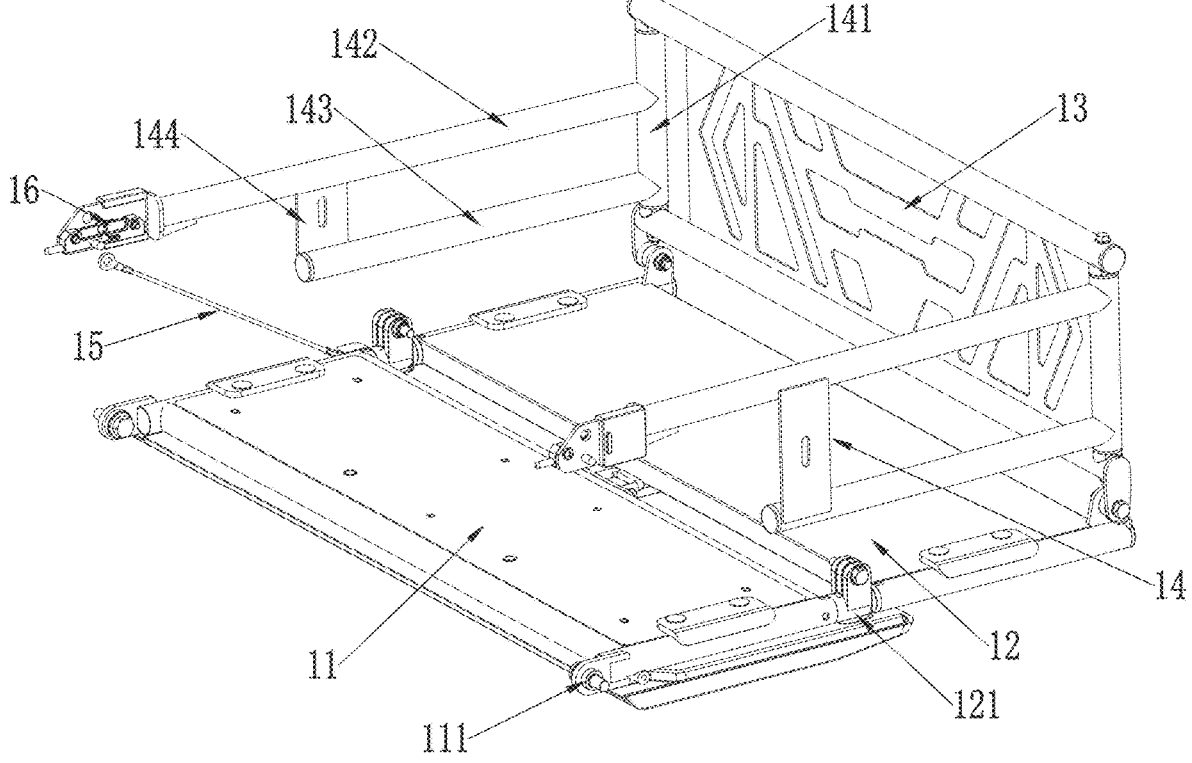
FIG. 6 is a perspective view of two side rails of the foldable storage basket according to the preferred embodiment of the present disclosure, while the two side rails are misaligned.

As shown in FIG. 5, the second locking buckle 41 comprises a fixed plate 43 and a hook plate 45 rotatably connected to the fixed plate 43 via a torsion spring 44. An outward side of the fixed plate 43 comprises a buckling groove 46, and the hook plate 45 comprises a hook portion 47 disposed in the buckling groove 46. The first locking buckle 113 has a U-shaped buckle 114. When the first locking buckle 113 is inserted into the buckling groove 46, the hook plate 45 is pressed upward by a rotation of the torsion spring 44 to enable the U-shaped buckle 114 to be inserted into the buckling groove 46. After that, the hook plate 45 is not being pressed by the U-shaped buckle 114 and is pushed downward by a return force of the torsion spring 44. Therefore, the hook plate 45 is interlocked with the U-shaped buckle 114 to cause the U-shaped buckle 114 to be locked in the buckling groove 46.

The unlocking member 42 is connected to the hook plate 45 via a connecting rod 48. By moving the unlocking member 42, the connecting rod 48 drives the hook plate 45 to move upward, causing the hook portion 47 to be separated from the U-shaped buckle 114. The interlocking connection of the U-shaped buckle 114 is released, and the first foldable bottom plate 11 can be rotated and unfolded. The foldable storage basket 1 improves space utilization. When a backpack needs to be placed on the foldable storage basket 1, the foldable storage basket 1 can be unfolded to maximize a space at the rear of the electric cart, providing additional storage space.

The above is only a preferred specific implementation method of the present disclosure, but the design concept of the present disclosure is not limited to this. Any technician familiar with the technical field who uses this concept to make non-substantial changes to the present disclosure within the technical scope disclosed by the present disclosure shall be deemed to infringe the protection scope of the present disclosure.

What is claimed is:

1. A foldable storage basket for of an electric cart that has two upright posts disposed on two sides of a rear of the electric cart, comprising, wherein:

the electric cart comprises two upright posts disposed on two sides of a rear of the electric cart, a mounting frame for attachment is fixedly mounted between the two upright posts, wherein:

the foldable storage basket is mounted on the mounting frame, the foldable storage basket comprises a folding assembly, one or more supporting pulling ropes, and one or more slow-descent devices, the folding assembly is configured to be unfolded to form a storage space, the mounting frame comprises two side mounting plates and a transverse beam connected to the two side mounting plates, the folding assembly comprises a first foldable bottom plate rotatably connected to the two side mounting plates, at least one side of the first foldable bottom plate is disposed with the one or more supporting pulling ropes, the at least one side of the first foldable bottom plate is disposed with the one or more slow-descent devices, and when the folding assembly is released to be unfolded:

the first foldable bottom plate is rotated downward, and the one or more slow-descent devices are configured to reduce a speed of a downward rotation of the first foldable bottom plate.

2. The foldable storage basket for of the electric cart according to claim 1, wherein:

the folding assembly comprises a second foldable bottom plate, a foldable upright plate, and two side rails, an inner side of the first foldable bottom plate is rotatably connected to the two side mounting plates, an inner side of the second foldable bottom plate is rotatably connected to an outer side of the first foldable bottom plate, a bottom edge of the foldable upright plate is rotatably connected to an outer side of the second foldable bottom plate, the two side rails are respectively mounted on two sides of the foldable upright plate, and ends of the two side rails away from the foldable upright plate are detachably connected to the two upright posts by insertion.

3. The foldable storage basket for of the electric cart according to claim 2, wherein:

each of the two side rails comprises a first connecting rod and a second connecting rod, the second connecting rod is located below the first connecting rod, the first connecting rod and the second connecting rod are connected by a connecting plate, the first connecting rods of the two side rails are misaligned with each other in an up-and-down direction along the two sides of the foldable upright plate, so that the first connecting rods of the two side rails are misaligned with each other after being folded, and a sum of lengths of the second connecting rods of the two side rails is less than or equal to a length of the bottom edge of the foldable upright plate.

4. The foldable storage basket for of the electric cart according to claim 3, wherein:

an end of the first connecting rod of each of the two side rails away from the foldable upright plate is disposed with an insertion member, a position of the transverse beam of the mounting frame corresponding to the insertion member is disposed with an insertion plate, the insertion member comprises a housing and a first insertion pin movably disposed in the housing, the insertion plate comprises a first insertion hole, the housing comprises a sliding groove, the first insertion pin is configured to slide in the sliding groove so as to alternatively slide to a first position or a second position, when the first insertion pin is in the first position:

the first insertion pin is disposed in the first insertion hole, and the first connecting rod is connected to the mounting frame, and when the first insertion pin is in the second position:

the first insertion pin is separated from the first insertion hole, and the first connecting rod is separated from the mounting frame.

5. The foldable storage basket for of the electric cart according to claim 4, wherein:

the first insertion pin is disposed with a protrusion, the protrusion extends out of the sliding groove, a rear end of the first insertion pin is fixedly connected to an elastic member, the elastic member is confined in the housing, and the first insertion pin is configured to be driven by the elastic member to extend out to be disposed in the first insertion hole.

6. The foldable storage basket for of the electric cart according to claim 4, wherein:

each of the two side mounting plates is disposed with a second insertion pin corresponding to the first position of the insertion member, the insertion member comprises a second insertion hole, when the first insertion pin is in the first position, the second insertion pin is disposed in the second insertion hole, and the second insertion pin is configured to be separated from the second insertion hole to allow the first insertion pin to be separated from the first insertion hole.

7. The foldable storage basket for of the electric cart according to claim 1, wherein:

the one or more slow-descent devices are pneumatic rods or hydraulic rods.

8. The foldable storage basket for of the electric cart according to claim 1, wherein:

the first foldable bottom plate comprises a first locking buckle, the transverse beam is disposed with a supporting frame, the supporting frame comprises a second locking buckle corresponding to the first locking buckle, when the folding assembly is folded, the first locking buckle is buckled to the second locking buckle, and the second locking buckle is disposed with an unlocking member configure to release the first locking buckle.

9. The foldable storage basket for of the electric cart according to claim 8, wherein:

the first locking buckle has a U-shaped buckle, the second locking buckle comprises a fixed plate and a hook plate rotatably connected to the fixed plate via a torsion spring, an outward side of the fixed plate comprises a buckling groove, the hook plate comprises a hook portion disposed in the buckling groove, the U-shaped buckle is configured to be disposed in the buckling groove, so that an outer side of the U-shaped buckle is hooked by the hook portion to form a locking connection, the unlocking member is connected to the hook plate via a connecting rod, and the unlocking member is configured to be moved upward to drive the hook plate to move upward through the connecting rod, causing the hook portion to be separated from the U-shaped buckle.

10. An electric cart, comprising:

the foldable storage basket for of the electric cart according to claim 1.

11. An electric cart, comprising:

the foldable storage basket for of the electric cart according to claim 2.

12. An electric cart, comprising:

the foldable storage basket for of the electric cart according to claim 3.

13. An electric cart, comprising:

the foldable storage basket for of the electric cart according to claim 4.

14. An electric cart, comprising:

the foldable storage basket for of the electric cart according to claim 5.

15. An electric cart, comprising:

the foldable storage basket for of the electric cart according to claim 6.

16. An electric cart, comprising:

the foldable storage basket for of the electric cart according to claim 7.

17. An electric cart, comprising:

the foldable storage basket for of the electric cart according to claim 8.

18. An electric cart, comprising:

the foldable storage basket for of the electric cart according to claim 9.

* * * * *